US012032721B2

(12) United States Patent
Singhal et al.

(10) Patent No.: US 12,032,721 B2
(45) Date of Patent: Jul. 9, 2024

(54) SYNTHESIZING USER TRANSACTIONAL DATA FOR DE-IDENTIFYING SENSITIVE INFORMATION

(71) Applicant: Yodlee, Inc., San Mateo, CA (US)

(72) Inventors: Gaurav Singhal, Bangalore (IN); Deepak Patil, Pune (IN); Rahul Mitra, Kalyani (IN); Atif Adib, Bangalore (IN)

(73) Assignee: YODLEE, INC., San Mateo, CA (US)

( * ) Notice: Subject to any disclaimer, the term of this patent is extended or adjusted under 35 U.S.C. 154(b) by 324 days.

(21) Appl. No.: 17/506,508

(22) Filed: Oct. 20, 2021

(65) Prior Publication Data

US 2023/0121356 A1   Apr. 20, 2023

(51) Int. Cl.

| | | |
|---|---|---|
| *G06F 21/62* | (2013.01) | |
| *G06F 18/2323* | (2023.01) | |
| *G06N 5/022* | (2023.01) | |
| *G06Q 20/38* | (2012.01) | |
| *G06Q 20/40* | (2012.01) | |

(52) U.S. Cl.
CPC ...... *G06F 21/6254* (2013.01); *G06F 18/2323* (2023.01); *G06N 5/022* (2013.01); *G06Q 20/389* (2013.01); *G06Q 20/401* (2013.01)

(58) Field of Classification Search
CPC . G06F 21/6254; G06F 18/2323; G06N 5/022; G06Q 20/389; G06Q 20/401; G06Q 20/383; G06Q 30/0615
See application file for complete search history.

(56) References Cited

U.S. PATENT DOCUMENTS

| | | | |
|---|---|---|---|
| 7,200,757 B1 | 4/2007 | Muralidhar et al. | |
| 9,720,943 B2 | 8/2017 | Mattsson et al. | |
| 10,075,291 B1 * | 9/2018 | Molaro | G06F 16/16 |
| 11,334,891 B1 * | 5/2022 | Spender | H04L 63/083 |

(Continued)

FOREIGN PATENT DOCUMENTS

| | | | |
|---|---|---|---|
| CN | 111971675 A | 11/2020 | |
| EP | 4170574 A1 | 4/2023 | |
| WO | WO-2018015409 A1 * | 1/2018 | G06F 21/32 |

OTHER PUBLICATIONS

Trouillon et al., "Complex Embeddings for Simple Link Prediction," Proceedings of the 33rd International Conference on Machine Learning, 2016, 12 pages, retrieved from https://arxiv.org/abs/1606.06357.

(Continued)

*Primary Examiner* — Mohammed Waliullah
(74) *Attorney, Agent, or Firm* — Zilka-Kotab, P.C.

(57) ABSTRACT

As described herein, a system, method, and computer program are provided for synthesizing user transactional data for de-identifying sensitive information. In use, transactional data of a plurality of users is identified. Additionally, the plurality of users are clustered based on the transactional data, to form groups of users having transactional data representing similar transactional behavior. Further, synthesized transactional data is generated for the users in each group by: identifying a subset of the transactional data that corresponds to the users in each group, shuffling the transactional data in the subset across the users in each group, and perturbing portions of the shuffled transactional data.

18 Claims, 12 Drawing Sheets

(56) References Cited

U.S. PATENT DOCUMENTS

| | | | | |
|---|---|---|---|---|
| 11,768,960 | B1* | 9/2023 | Carasso | G06F 16/2322 |
| | | | | 707/756 |
| 2014/0281572 | A1* | 9/2014 | Wang | G06F 21/6254 |
| | | | | 713/189 |
| 2014/0282219 | A1* | 9/2014 | Haddock | G06F 16/22 |
| | | | | 715/781 |
| 2014/0297644 | A1* | 10/2014 | Cheng | G06N 5/022 |
| | | | | 707/737 |
| 2016/0117526 | A1* | 4/2016 | Takahashi | G06F 21/6254 |
| | | | | 726/26 |
| 2016/0140544 | A1* | 5/2016 | Howe | G06F 21/6254 |
| | | | | 705/74 |
| 2016/0224804 | A1* | 8/2016 | Carasso | G06F 16/2322 |
| 2021/0383068 | A1* | 12/2021 | Mattivi | G06N 3/08 |
| 2022/0156175 | A1* | 5/2022 | Periyathambi | G06F 40/20 |
| 2023/0056595 | A1* | 2/2023 | Park | G06F 18/214 |

OTHER PUBLICATIONS

Li et al., "Graph-Based Privacy-Preserving Data Publication," IEEE Infocom, The 35th Annual IEEE International Conference on Computer Communications, 2016, 9 pages, retrieved from https://www.researchgate.net/publication/304670616_Graph-Based_Privacy-Preserving_Data_Publication.

Elluri et al., "An Integrated Knowledge Graph to Automate GDPR and PCI DSS Compliance," Proceedings of the IEEE International Conference on Big Data, 2018, 6 pages.

Qian et al., "Social Network De-Anonymization and Privacy Inference with Knowledge Graph Model," IEEE Transactions on Dependable and Secure Computing (preprint), 2017, 14 pages, retrieved from https://www.semanticscholar.org/paper/Social-Network-De-Anonymization-and-Privacy-with-Qian-Li/e98634ae6ecdb8b7fdb1aeeb0db95c901b07e888.

Muralidhar et al., "Generating Sufficiency-based Non-Synthetic Perturbed Data," Transactions on Data Privacy, vol. 1, 2008, pp. 17-33.

Ravi et al., "A Non Synthetic Data Perturbation Technique for Privacy Preservation in Association Rule Mining," International Journal of Applied Engineering Research, vol. 9, No. 24, 2014, pp. 24311-14320.

Dwork et al., "Calibrating Noise to Sensitivity in Private Data Analysis," Theory of Cryptography Conference, 2006, pp. 265-284.

Park et al., "PeGS: Perturbed Gibbs Samplers that Generate Privacy-Compliant Synthetic Data," Transactions on Data Provacy, vol. 7, 2014, pp. 253-282.

Muralidhar et al., "Data Shuffling—A New Masking Approach for Numerical Data," Management Science, vol. 52, 2006, pp. 658-670.

Extended European Search Report from European Application No. 22201946.5, dated Jan. 19, 2023.

Sasada et al., "Anonymizing Location Information in Unstructured Text Using Knowledge Graph," The 22nd International Conference on Information Integration and Webbased Applications & Services, Nov. 30-Dec. 2, 2020, 5 pages.

Li et al., "A hybrid approach to prevent composition attacks for independent data releases," Information Sciences, 2016, pp. 324-336.

Wikipedia, "Data masking," Wikipedia, 2013, 5 pages, retrieved from http://en.wikipedia.org/w/index.php?title=Data_masking&oldid=552392298.

Li et al., "Using deep learning to preserve data confidentiality," Applied Intelligence, vol. 50, Jul. 24, 2019, pp. 341-353.

Examination Report from Australian Application No. 2022215149, dated May 2, 2023.

Office Action from Indian Application No. 202224056130, dated Sep. 21, 2023, 7 pages.

* cited by examiner

| Original Description | Transaction Type | Amount | Medium | Category |
|---|---|---|---|---|
| SYNCB Phone    DES:Payment    ID:<first-name><last-name><br>INDN:**********8899             CO ID:9334 | debit | 47.22 | Synchrony bank | Credit Card Payments |

| Description | Transaction Type | Amount | Medium | Category |
|---|---|---|---|---|
| SYNCB Phone    DES:Payment    ID:<first-name><last-name><br>INDN:**********8899             CO ID:9334 | debit | 46.68 | Synchrony bank | Credit Card Payments |

| Description | Transaction Type | Amount | Medium | Category |
|---|---|---|---|---|
| INDN:**********8899    ID:<first-name> <last-name> SYNCB Phone<br>CO ID:9334   DES:Payment | debit | 46.68 | Synchrony bank | Credit Card Payments |

| Synthetic Description | Transaction Type | Amount | Medium | Category |
|---|---|---|---|---|
| INDN:**********8899    ID:XXXX XXXX  SYNCB Phone    CO ID:9334<br>DES:Payment | debit | 46.68 | Synchrony bank | Credit Card Payments |

| Synthetic Description | Transaction Type | Amount | Medium | Category |
|---|---|---|---|---|
| INDN:**********8899 q95 ID:XXXX XXXX SYNCB Phone CO ID:9334<br>0l5IWDAWTVSTCW9 DES:Payment | debit | 46.68 | Synchrony bank | Credit Card Payments |

Step 1   Step 2   Step 3   Step 4

FIG. 10

SYNTHESIZING USER TRANSACTIONAL DATA FOR DE-IDENTIFYING SENSITIVE INFORMATION

FIELD OF THE INVENTION

The present invention relates to processes for removing sensitive information from user data.

BACKGROUND

As user data flows through multiple systems within or across organizations, the likelihood of a malicious attack to identify personal markers in the data also increases many folds. Many systems rely on attack prevention (e.g. software, etc.) to protect sensitive user information. However, the increasing sophistication of such attacks in some cases enables attacks to avoid detection, interception, etc. by the relied upon attack prevention techniques.

There is thus a need for addressing these and/or other issues associated with the prior art, including a need to provide protection of sensitive user information in other ways.

SUMMARY

As described herein, a system, method, and computer program are provided for synthesizing user transactional data for de-identifying sensitive information. In use, transactional data of a plurality of users is identified. Additionally, the plurality of users are clustered based on the transactional data, to form groups of users having transactional data representing similar transactional behavior. Further, synthesized transactional data is generated for the users in each group by: identifying a subset of the transactional data that corresponds to the users in each group, shuffling the transactional data in the subset across the users in each group, and perturbing portions of the shuffled transactional data.

BRIEF DESCRIPTION OF THE DRAWINGS

FIG. 10 illustrates an exemplary transaction perturbed via a series of steps, in accordance with one embodiment.

DETAILED DESCRIPTION

Figure 1:
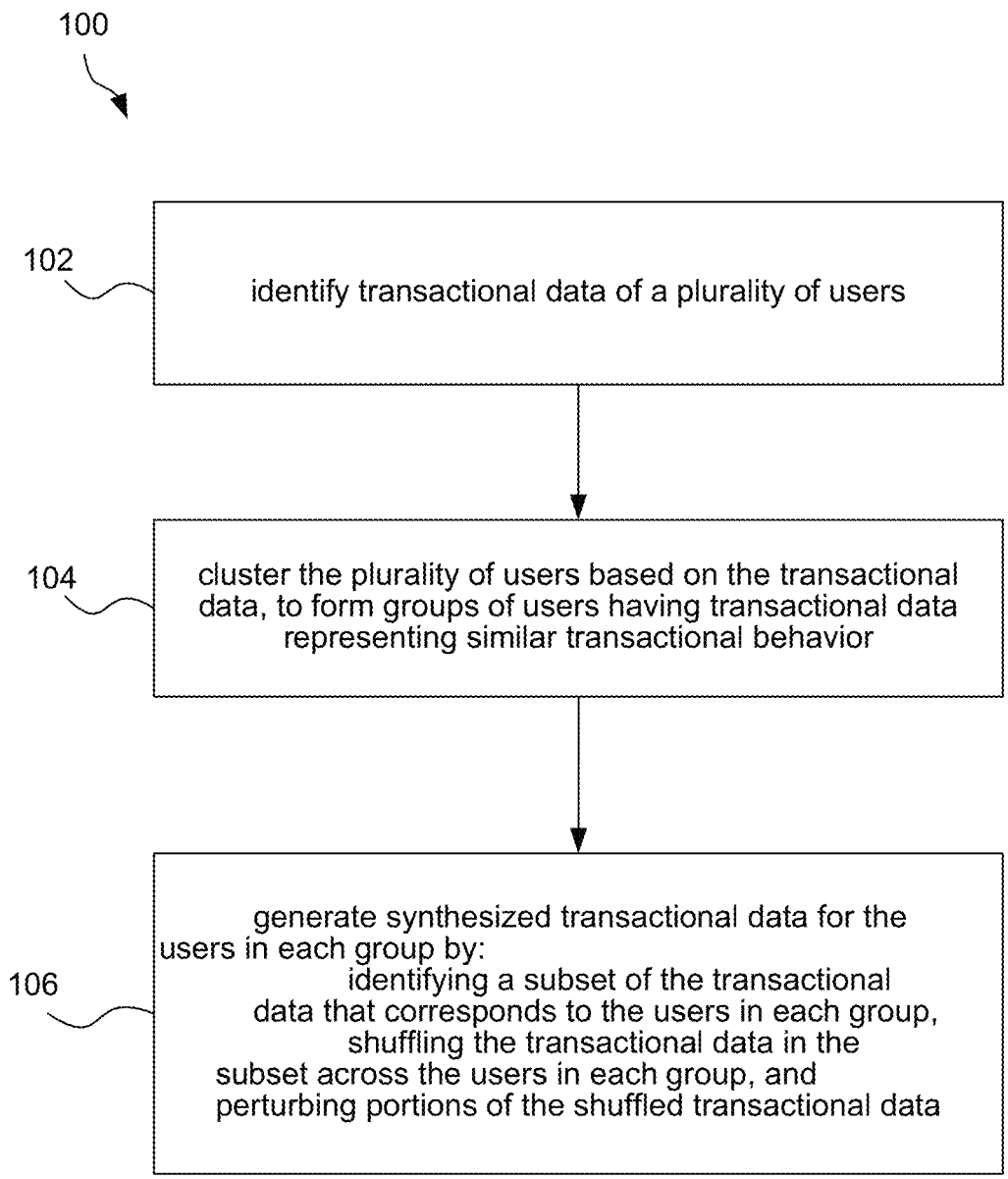
FIG. 1 illustrates a method for synthesizing user transactional data, in accordance with one embodiment.

FIG. 1 illustrates a method 100 for synthesizing user transactional data, in accordance with one embodiment. The method 100 may be performed any computer system, such as those described below with respect to FIGS. 11 and/or 12. For example, the method 100 may be performed by a computer system interfacing a system of one or more financial institutions that generate transactional data, and possibly another system independent of the financial institution(s) that uses the transaction data for any analysis purposes. The computer system performing the method 100 may be a sub-system of a financial institution. The method 100 is performed for de-identifying sensitive information in the transactional data while providing maximum data value retention.

In operation 102, transactional data of a plurality of users is identified. The transactional data refers to any data representing transactions associated with the plurality of users. In one embodiment, the transactional data may be transactional records (i.e. records of transactions) stored for the plurality of users. For example, the transactions may be financial transactions, such as credit card purchases, money transfers, etc. In one embodiment, the transactional data may correspond to transactions that occurred within a defined period of time.

In operation 104, the plurality of users are clustered based on the transactional data, to form groups of users having transactional data representing similar transactional behavior. The users may be clustered based on various features of the transactional data, such as transaction category (e.g. purchase, transfer, etc.), merchant, geo-location, time, etc.

In one embodiment, the users may be clustered by encoding historical transactional data to form of a knowledge graph, learning a continuous representation for entities in the graph (i.e. a model), and clustering the plurality of users based on the learned entities. The knowledge graph may be generated to include nodes representing users, merchants, and geo-locations, as well as edges representing transaction features.

In operation 106, synthesized transactional data is generated for the users in each group by: identifying a subset of the transactional data that corresponds to the users in each group, shuffling the transactional data in the subset across the users in each group, and perturbing portions of the shuffled transactional data. Thus, the synthesizing of operation 106 may be performed for each user group formed in operation 104. The subset of the transactional data that corresponds to the users in each group may include all of the transactional data identified in operation 104 that corresponds to the users in the group.

In one embodiment, the shuffling of the transactional data in the subset may be performed stochastically (i.e. in at least a partially random manner). In another embodiment, the shuffling may include constructing a pool of transactions from the subset of the transactional data and, for each user in the group, sampling transactions from the pool. As an option, the sampling may be based on a number of transactions associated with the user in the subset of the transactional data, and a category of each of the transactions associated with the user in the subset of the transactional data. For example, a number of transactions sampled from the pool for each user in the group may match the number of transactions in the subset of the transactional data that are associated with the user. As another example, a number of transactions of a particular category sampled from the pool for each user in the group matches a number of transactions of the particular category in the subset of the transactional data that are associated with the user.

The perturbing of the portions of the shuffled transactional data may also be performed stochastically (i.e. in at least a partially random manner). In one embodiment, the perturbing may include perturbing transaction amounts within the shuffled transactional data. For example, one or more of the transaction amounts may be perturbed (e.g. a random amount) up to a predefined maximum threshold percentage of the original transaction amount.

In another embodiment, the perturbing may include shuffling elements of transaction descriptions within the shuffled transactional data. The elements may be predefined for transactions (e.g. for various transaction descriptions). For example, in one embodiment the elements are one or more consecutive words in a transaction description carrying homogeneous related information and are identified using machine learning models. As an option, the elements within each of the transaction descriptions may be shuffled randomly.

In yet another embodiment, the perturbing may include masking Personally Identifiable Information (PII). The PII may include, for example, social security number, credit card number, user name, and/or any other predefined information capable of being used alone or in combination to uniquely identify a particular user. As an option, the masking may be performed using deep learning.

In still yet another embodiment, the perturbing may include adding noise to adding noise to transaction descriptions. The noise may be selected randomly. Positions within the transaction descriptions at which the noise is added may also be selected randomly.

To this end, the transactional data for the users in each group may be synthesized, according to the sub-steps of operation 106 described above. The resulting synthetic transactional data may have similar utility as compared to the original transactional data (i.e. no or limited value loss), but may not allow the users (e.g. of particular transactions) to be identified. The synthetic transactional data may also be generated to have similarity with the original data (i.e. a low difference in distribution of various metrics on synthetic and original data), while also minimizing user traceability (i.e. the ability to map transactions back to the original user).

For example, important key performance indicators (KPIs) may be preserved, (e.g. merchant or category level aggregates by other parameters such as state, city, source etc. may remain the same or similar to a defined extent). As another example, user behavior (e.g. spend patters) may also be maintained between the synthetic transactional data and the original transactional data. In this way, any adverse impact on products/services using the synthetic transactional data, as opposed to the original transactional data, may be avoided. Table 1 illustrates various aggregates that may be preserved during method 100.

TABLE 1

| First Dimension | Second Dimension | Granularity |
| --- | --- | --- |
| Amount | Merchant Category Geo - City/State | Daily/Weekly/Monthly/ Quarterly/Yearly |
| Transaction Count | Merchant Category Geo - City/State | Daily/Weekly/Monthly/ Quarterly/Yearly |

TABLE 1-continued

| First Dimension | Second Dimension | Granularity |
| --- | --- | --- |
| # of Users | Merchant Category Geo - City/State | Daily/Weekly/Monthly/ Quarterly/Yearly |
| User Cohorts | Merchant Category Geo - City/State | Daily/Weekly/Monthly/ Quarterly/Yearly |

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
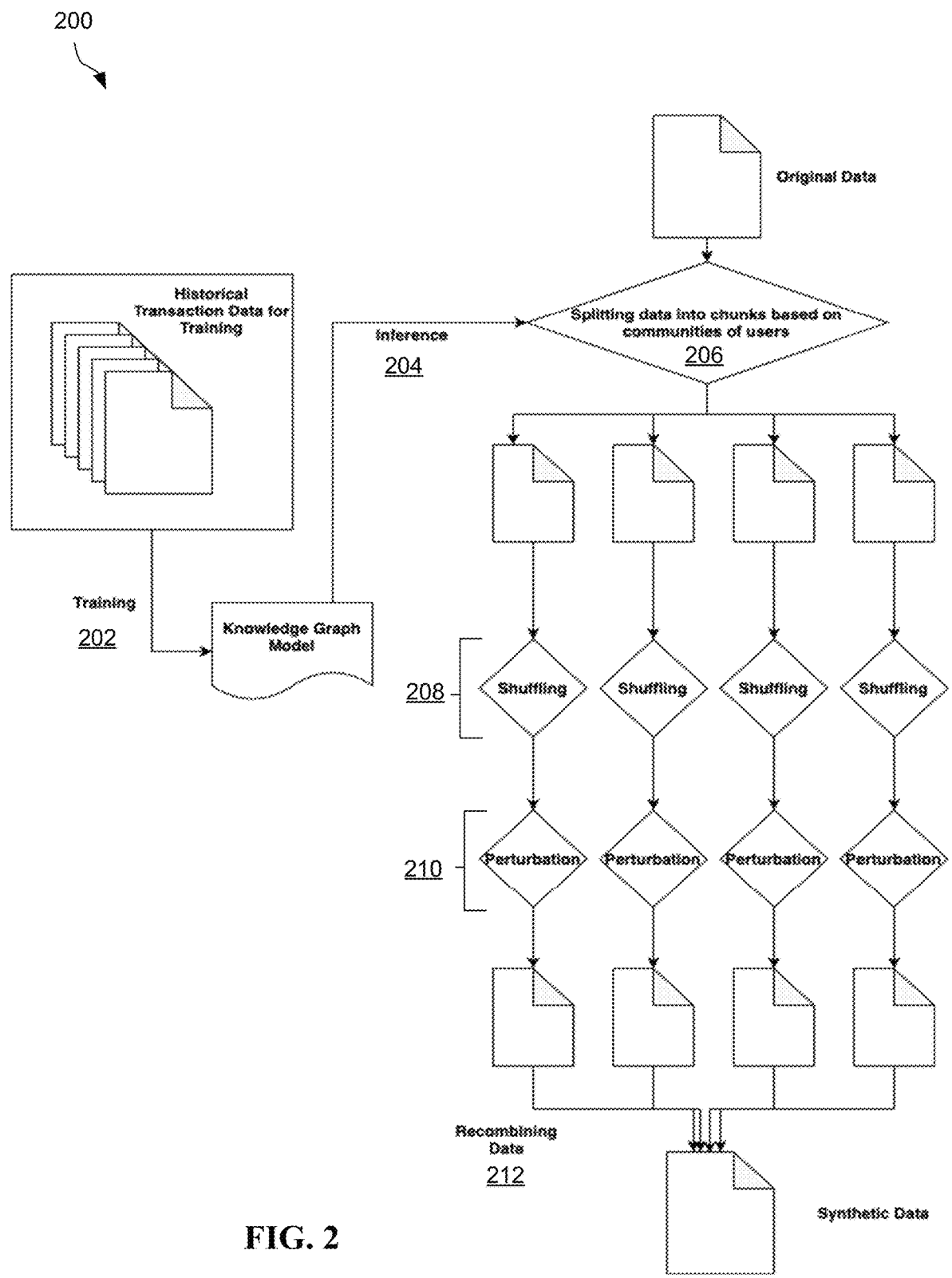
FIG. 2 illustrates a method for synthesizing user transactional data using a knowledge graph model, in accordance with one embodiment.

FIG. 2 illustrates a method 200 for synthesizing user transactional data using a knowledge graph model, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

As shown in operation 202, training is performed on historical transaction data to form a knowledge graph model. In operation 204, the knowledge graph model is used to infer clusters of users, based on original transactional data. In operation 206, the original transactional data is split in to chunks (i.e. portions), each chunk having a subset of the original transactional data that corresponds to a different cluster of the users.

In operation 208, transactional data in each of the chunks is shuffled across the users in corresponding cluster. In operation 210, portions of the shuffled transactional data in each of the chunks is perturbed to form synthetic transactional data for each of the clusters of users. In operation 212, the synthetic transactional data is combined to form combined synthetic transactional data corresponding to all of the original transactional data.

Figure 3:
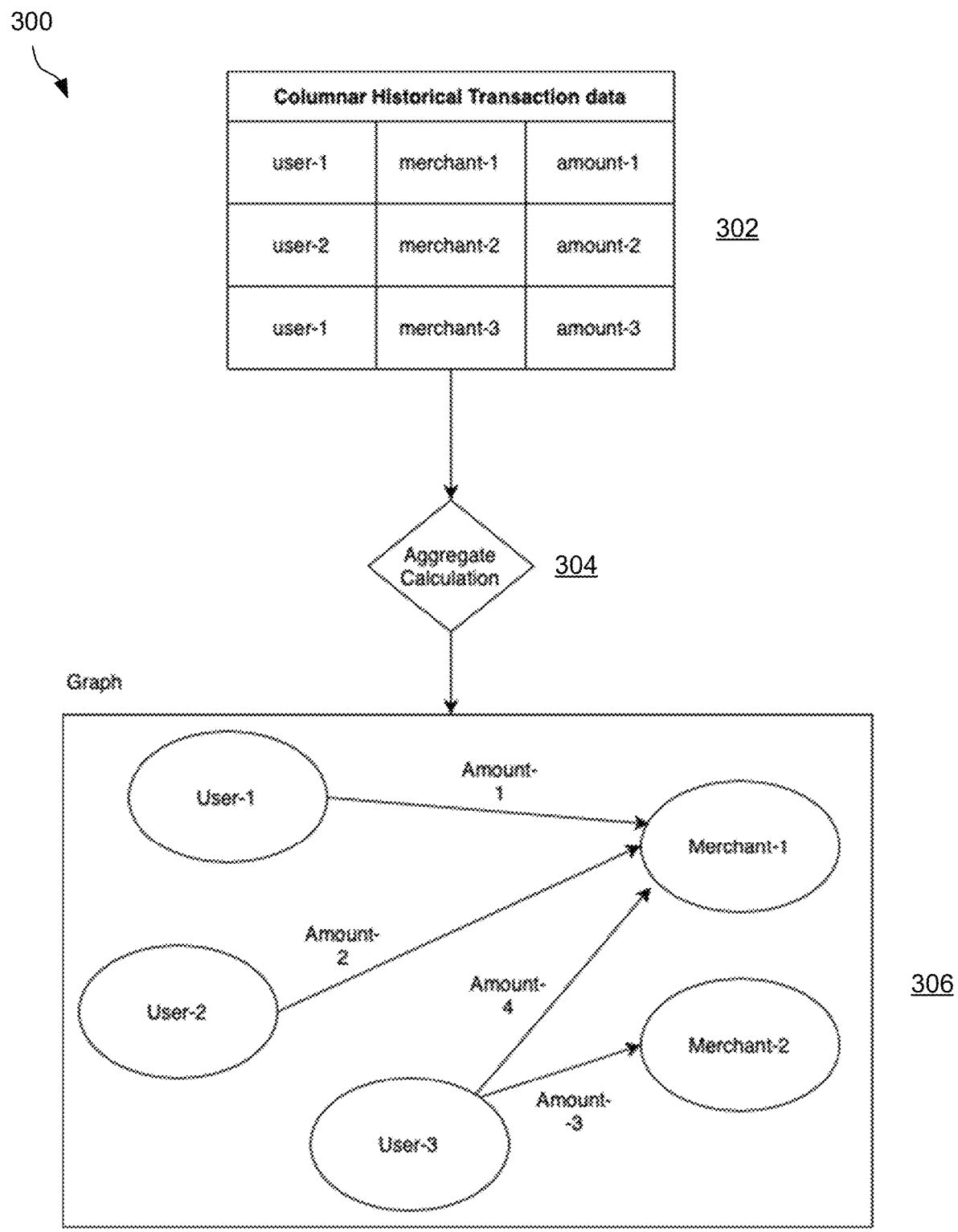
FIG. 3 illustrates a method for generating training data for a knowledge graph, in accordance with one embodiment.

FIG. 3 illustrates a method 300 for generating training data for a knowledge graph, in accordance with one embodiment. As an option, the method 300 may be carried out in the context of the details of the previous figure and/or any subsequent figure(s). For example, the method 300 may be carried out in the context of operation 202 where the knowledge graph model is generated from the historical transactional data. Of course, however, the method 300 may be carried out in the context of any desired environment. Further, the aforementioned definitions may equally apply to the description below.

In operation 302, historical transactional data is obtained. The historical transactional data is obtained for users from their aggregated accounts. The historical transactional data contains credit card purchases, checks, transfers, etc. and is stored in a columnar format, along with other information such as amount, date of purchase, geo-location, merchant, etc.

In operation 304, an aggregate calculation is performed on the historical transactional data. Aggregates are quantities which capture macro level user behavior over a period of time. In operation 306, the historical transactional data is transformed into a graph, using results of the aggregate calculation.

In particular, entities of a transaction, such as merchant, user, and geo-locations, are converted to vertices and the properties of a transaction, such as amount and ledger-type, are embedded into the edges. Aggregates for each edge are calculated in operation 304 by adding up the amount spent by a given user for a merchant over a specific period of time.

Figure 4:
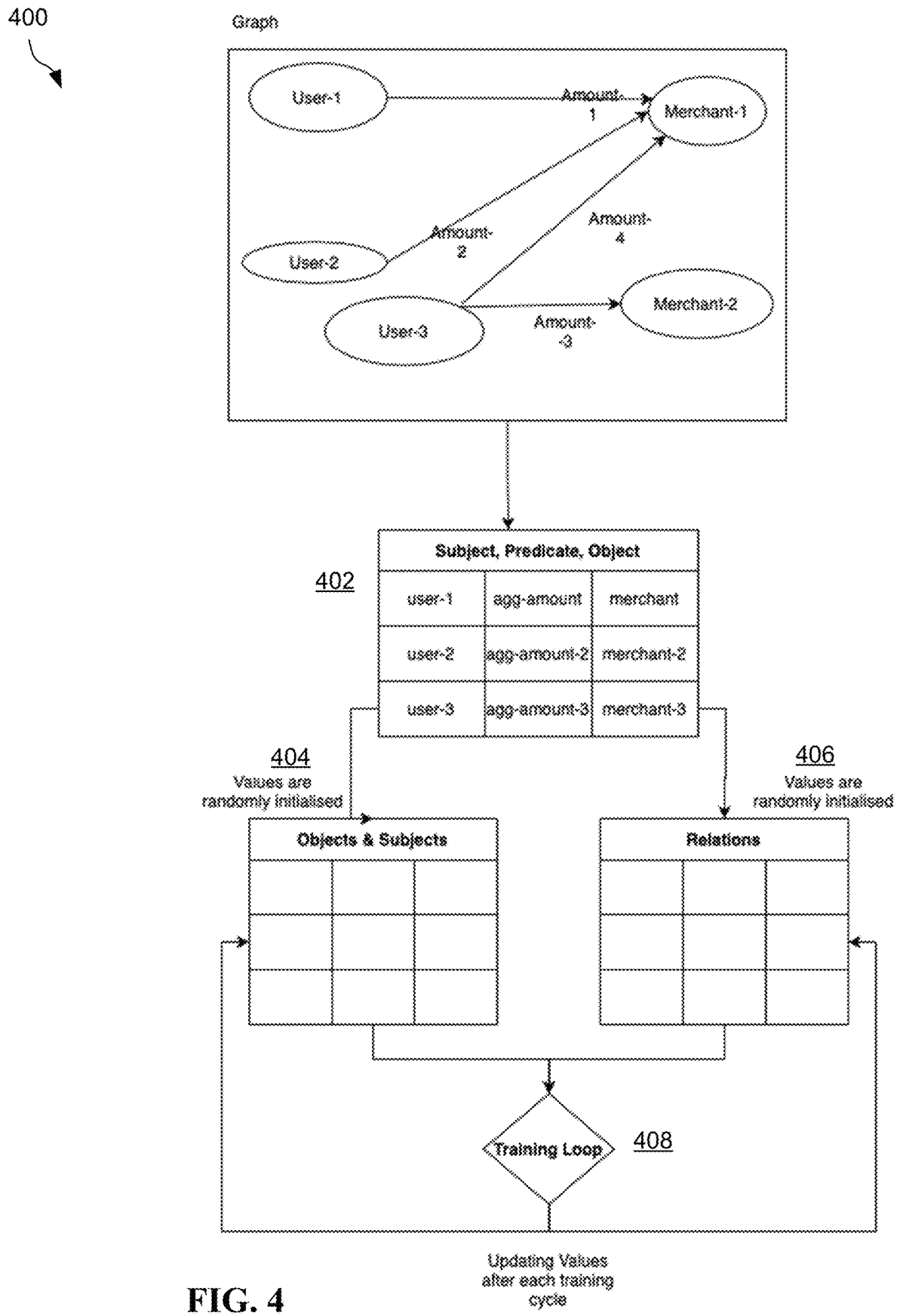
FIG. 4 illustrates a method for generating knowledge graph embeddings, in accordance with one embodiment.

FIG. 4 illustrates a method 400 for generating knowledge graph embeddings, in accordance with one embodiment. As an option, the method 400 may be carried out in the context of the details of the previous figure and/or any subsequent figure(s). For example, the method 400 may be carried out in the context of operation 202 where the knowledge graph model is generated from the historical transactional data. Of course, however, the method 300 may be carried out in the context of any desired environment. Further, the aforementioned definitions may equally apply to the description below.

In operation 402, the graph (e.g. generated in operation 306 of FIG. 3) is represented as a triplet (subject, predicate, object) which translates to (user, amount-aggregate, merchant). In operations 404 and 406, the real-valued vectors for each subject, object and predicate are randomly initialized to small real numbers. In operation 408, the values are updated in a training loop based on a scoring function.

The knowledge graph generates a n-dimensional real valued embedding for each entity in the graph, where n is chosen to give the most suitable degree of similarity. User representation will be created from: users historical spending pattern; users spending on each geo-location, where geo (city/state) embeddings are used from knowledge graph; users spending on each merchant, where merchant embeddings are used from knowledge graph. Using this representation, similar users will be grouped following a clustering technique.

Figure 5:
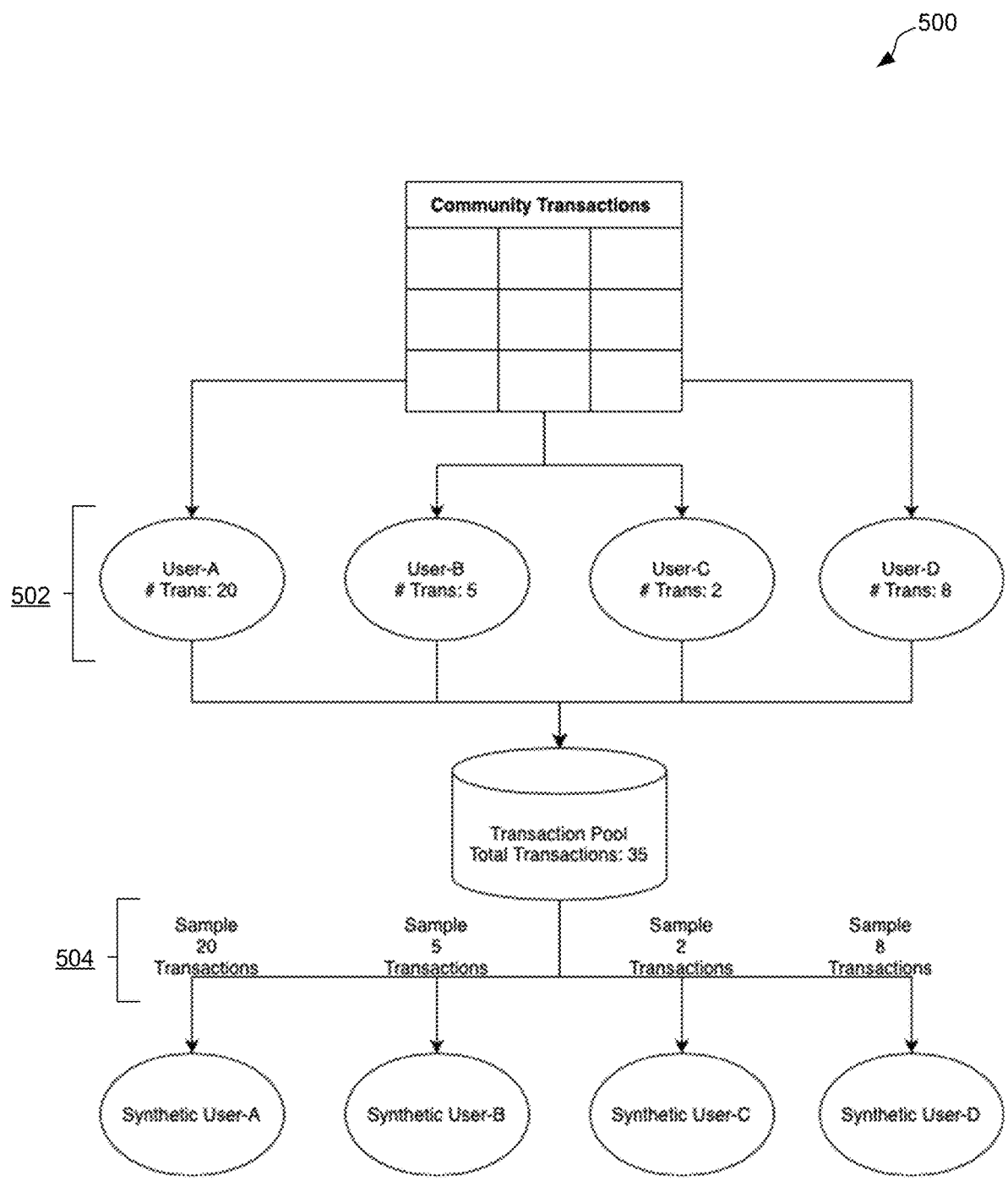
FIG. 5 illustrates a method for shuffling transactional data across users in a group, in accordance with one embodiment.

FIG. 5 illustrates a method 500 for shuffling transactional data across users in a group, in accordance with one embodiment. As an option, the method 500 may be carried out in the context of the details of the previous figure and/or any subsequent figure(s). For example, the method 500 may be carried out in the context of operation 208 where transactional data is shuffled across users in corresponding cluster. Of course, however, the method 500 may be carried out in the context of any desired environment. Further, the aforementioned definitions may equally apply to the description below.

In operation 502, a number of transactions for each user in a group is determined, as well as a category for each of the transactions. The transactions are pooled together. In operation 504, the transactions are sampled from the pool for each user in the group, based on the number and category of transactions determined for the user in operation 502.

Thus, all the transactions of a given group are pooled together, and then for each user the transaction are resampled from the pool based on how many and what category of transaction they had in the original data. For example: If user-A had 3 restaurant transactions, 2 grocery purchases and 1 Transfer, then 6 transactions from the pool will be sampled for the user such that 3 are restaurant transactions, 2 are grocery and 1 Transfer. However, since the sampling may be stochastic such that it is never guaranteed to pick the same category of transaction as the original one, thereby providing randomness to the resulting data.

The probability distribution of transactions may follow a bell-curve with a peak at the original transactions of the user. If the real user-A had 5 transactions, then the synthetic user-A will also have 5 transaction picked based on the probability distribution. Since, sampling is a stochastic process, there is inherent randomness associated to sampling the transactions and user-A ends with transactions similar to its original transactions. This method 500 protects the data from linkage attacks and other PII leakages, but preserves the aggregate metrics and utility of the data.

As an option, a similarity score between each pair of transactions may be calculated according to whether the pair has: a same transaction category, similar merchants (merchant embeddings are used from knowledge graph), and similar transaction amounts. Based on maximum similarity, transactions may be shuffled among different users within the user group.

Various restrictions may be considered during the shuffling, such as:

1. Shuffling users within a specific source of data (ensures KPIs are preserved within that source of data).
2. Shuffling will occur within a same date (ensures daily aggregates/KPIs are preserved).
3. Any Recurring transactions (Salary transaction), suitable to stay with original users, will not be shuffled.
4. Refund transaction and corresponding source transaction will be shuffled to a common user.
5. Outlier (high amount) transactions will not be shuffled.

Figure 6:
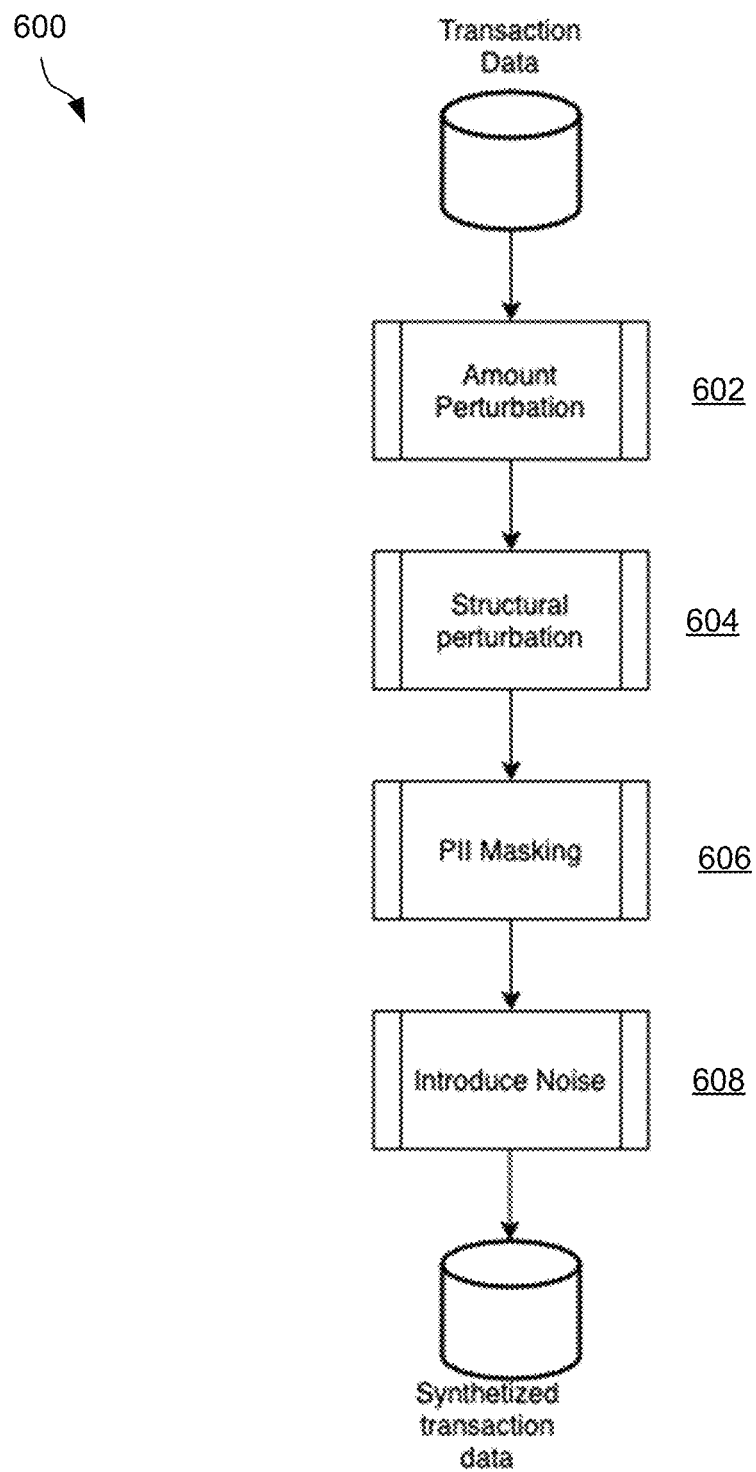
FIG. 6 illustrates a method for perturbing portions of shuffled transactional data, in accordance with one embodiment.

FIG. 6 illustrates a method 600 for perturbing portions of shuffled transactional data, in accordance with one embodiment. As an option, the method 600 may be carried out in the context of the details of the previous figure and/or any subsequent figure(s). For example, the method 600 may be carried out in the context of operation 210 where the shuffled transactional data is perturbed. Of course, however, the method 600 may be carried out in the context of any desired environment. Further, the aforementioned definitions may equally apply to the description below.

It should be noted that the method 600 may be performed for each transaction (record) in the shuffled transactional data to result in a synthesized transaction. In operation 602, transaction amount perturbation is performed (e.g. see method 700 of FIG. 7). In operation 604, structural perturbation is performed (e.g. see method 800 of FIG. 8).

In operation 606, PII masking is performed. The PII masking removes PII from the transactional data. The masking may be performed using a deep learning based system specifically developed for this task.

Figure 9:
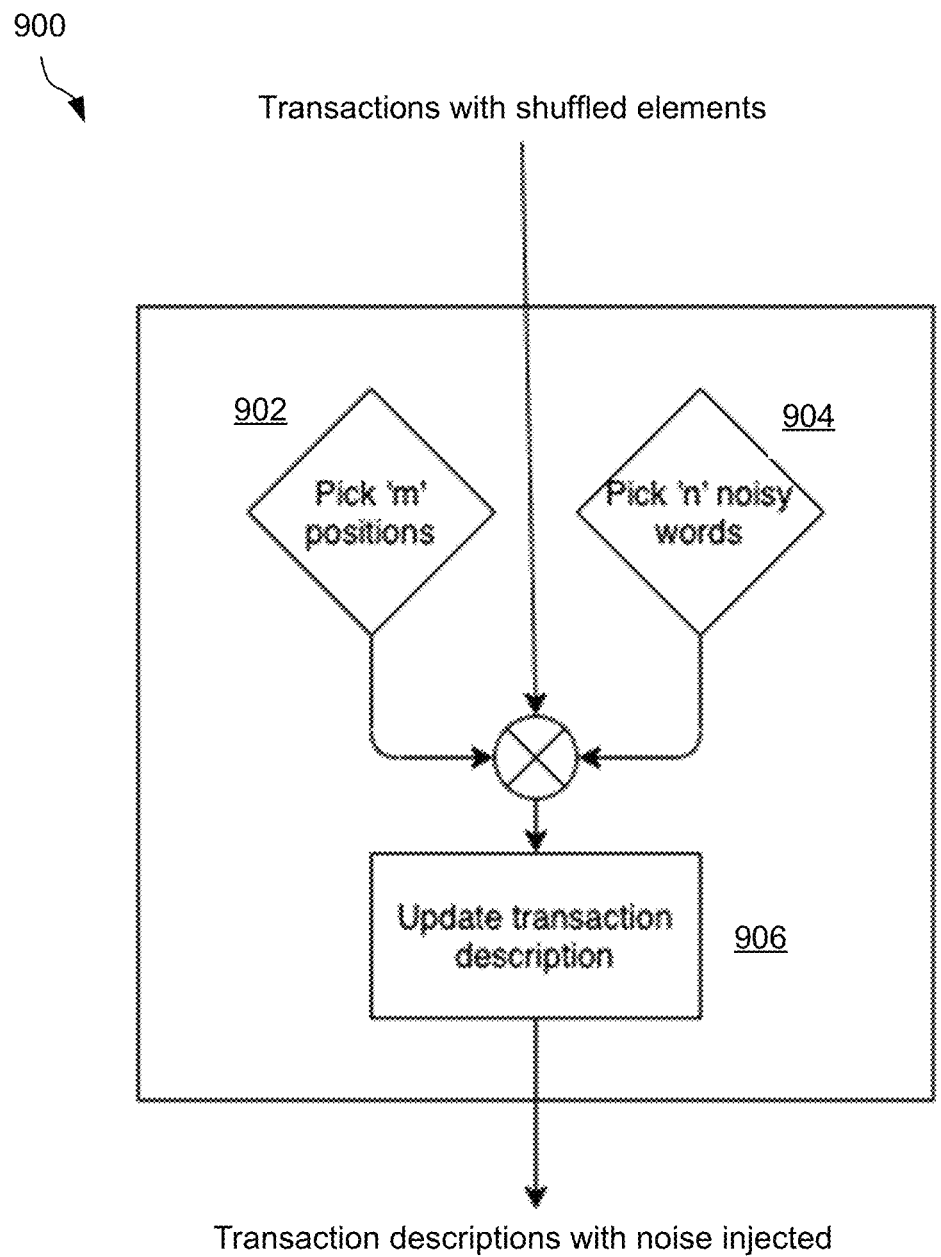
FIG. 9 illustrates a method for adding noise, in accordance with one embodiment.

In operation 608, noise is introduced (e.g. see method 900 of FIG. 9). It should be noted that the operations 602-608 may be performed in any desired order, or in parallel, and are not limited to the order described herein.

Figure 7:
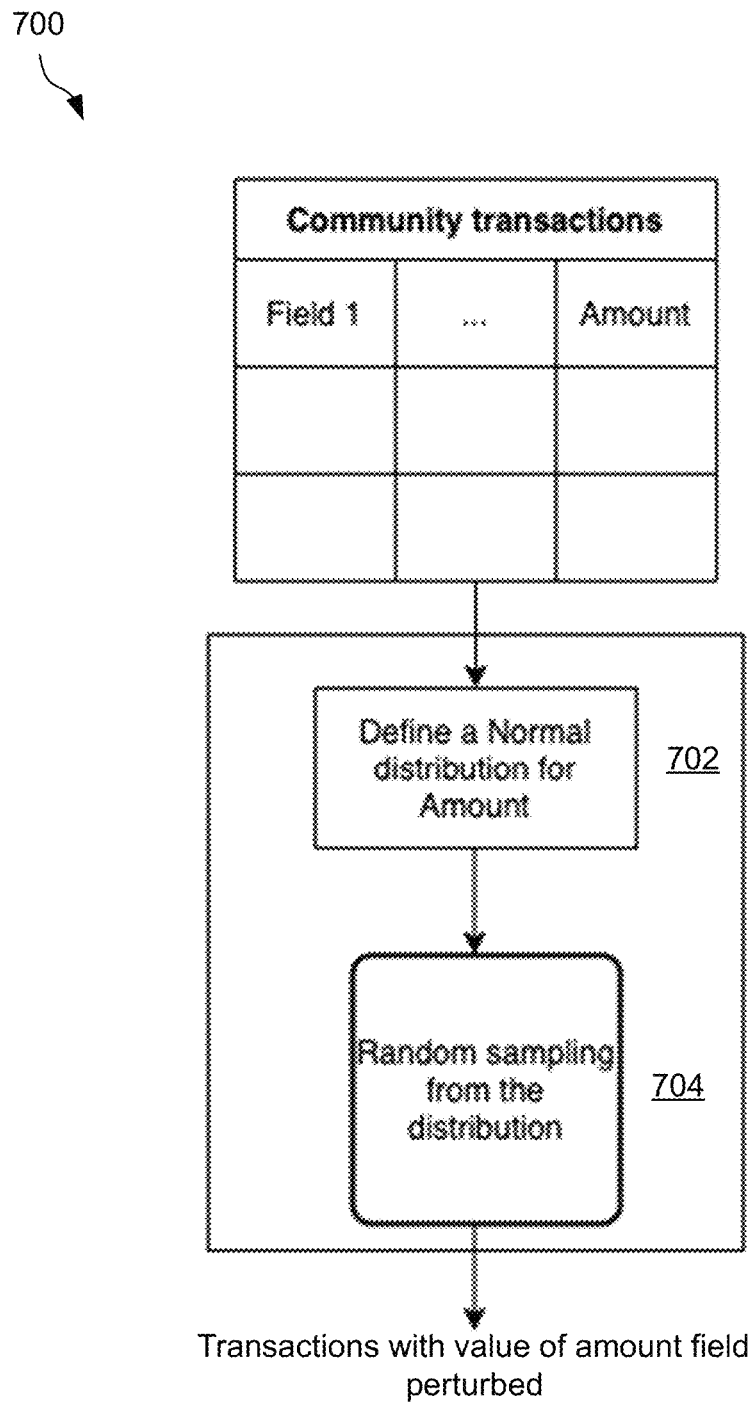
FIG. 7 illustrates a method for perturbing transaction amounts, in accordance with one embodiment.

FIG. 7 illustrates a method 700 for perturbing transaction amounts, in accordance with one embodiment. As an option, the method 700 may be carried out in the context of the details of the previous figure and/or any subsequent figure(s). For example, the method 700 may be carried out in the context of operation 602 where the transaction amount is perturbed. Of course, however, the method 700 may be carried out in the context of any desired environment. Further, the aforementioned definitions may equally apply to the description below.

In operation 702, a normal distribution of the amount is defined. In operation 704, random sampling from the distribution is performed, where the sampled amount is used as the new transaction amount. Perturbing the transaction amount includes changing the transaction amount by maximum defined percentage of the original transaction amount while maintaining all aggregate level insights. This perturbation provides an additional layer to ensure user de-identification without changing any rolled up level (aggregate) insights.

Figure 8:
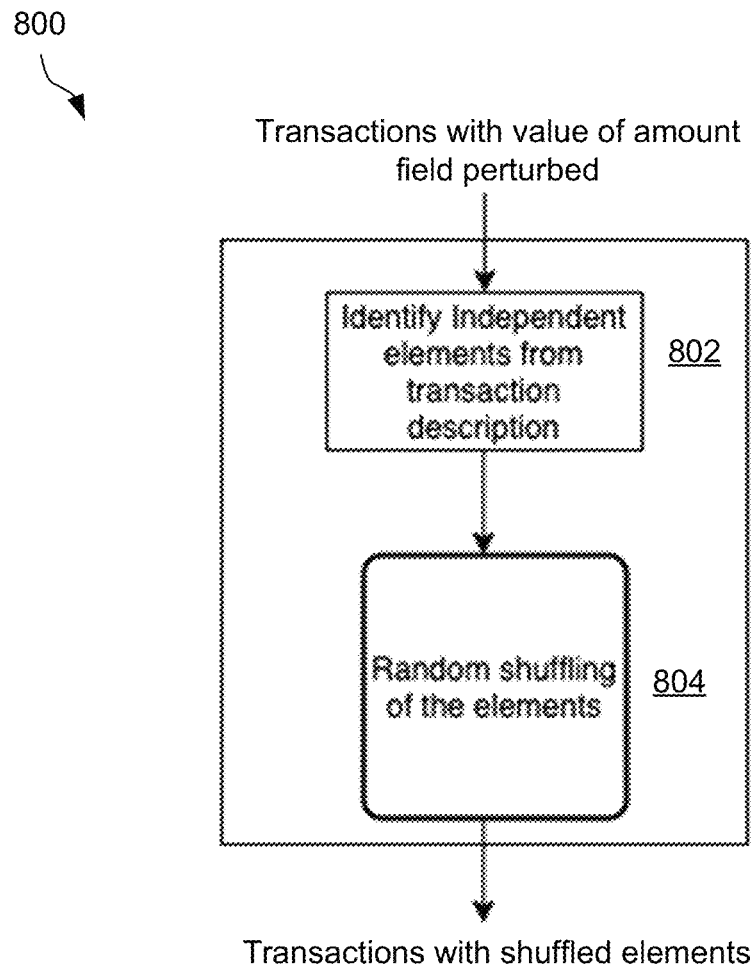
FIG. 8 illustrates a method for providing structural perturbation, in accordance with one embodiment.

FIG. 8 illustrates a method 800 for providing structural perturbation, in accordance with one embodiment. As an option, the method 800 may be carried out in the context of the details of the previous figure and/or any subsequent figure(s). For example, the method 800 may be carried out in the context of operation 604 where the structure is perturbed. Of course, however, the method 800 may be carried out in the context of any desired environment. Further, the aforementioned definitions may equally apply to the description below.

In operation 802, independent elements of the transaction description are identified. The independent elements may be identified according to soft-tabs defined already for the transaction. In operation 804, the elements are randomly shuffled. Smart shuffling within the transaction description reduces generalizability without damaging the contained information.

FIG. 9 illustrates a method 900 for adding noise, in accordance with one embodiment. As an option, the method 900 may be carried out in the context of the details of the previous figure and/or any subsequent figure(s). For example, the method 900 may be carried out in the context of operation 608 where the noise is added. Of course, however, the method 900 may be carried out in the context of any desired environment. Further, the aforementioned definitions may equally apply to the description below.

In operation 902, 'm' (e.g. random) positions within the transaction description are picked. In operation 904, 'n' (e.g. random) noisy words are picked. The noisy words refer to word which do no damage/update information contained within transaction description. In operation 906, the transaction description is updated to include the 'n' noisy words at the 'm' positions.

FIG. 10 illustrates an exemplary transaction perturbed via a series of steps, in accordance with one embodiment. The exemplary transaction may be perturbed according to the method 600 of FIG. 6.

In step (1), the original transaction amount is perturbed. In step (2), the structure (transaction description) is perturbed. In step (3), the PII is masked. In step (4), the noise is added to the transaction description.

Figure 11:
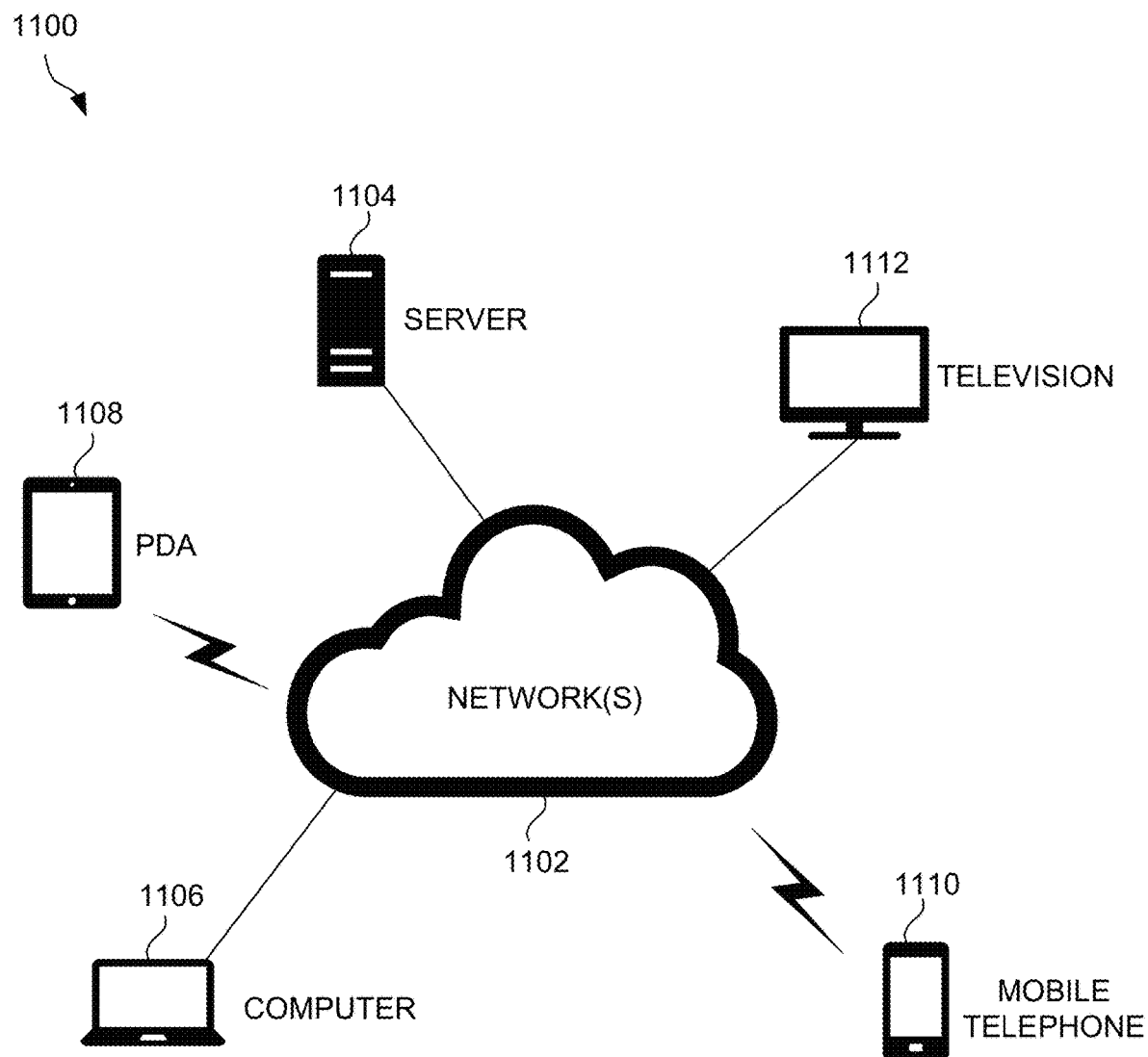
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1104 and an end user computer 1106 may be coupled to the network 1102 for communication purposes. Such end user computer 1106 may include a desktop computer, lap-top computer, and/or any other type of logic. Still yet, various other devices may be coupled to the network 1102 including a personal digital assistant (PDA) device 1108, a mobile phone device 1110, a television 1112, etc.

Figure 12:
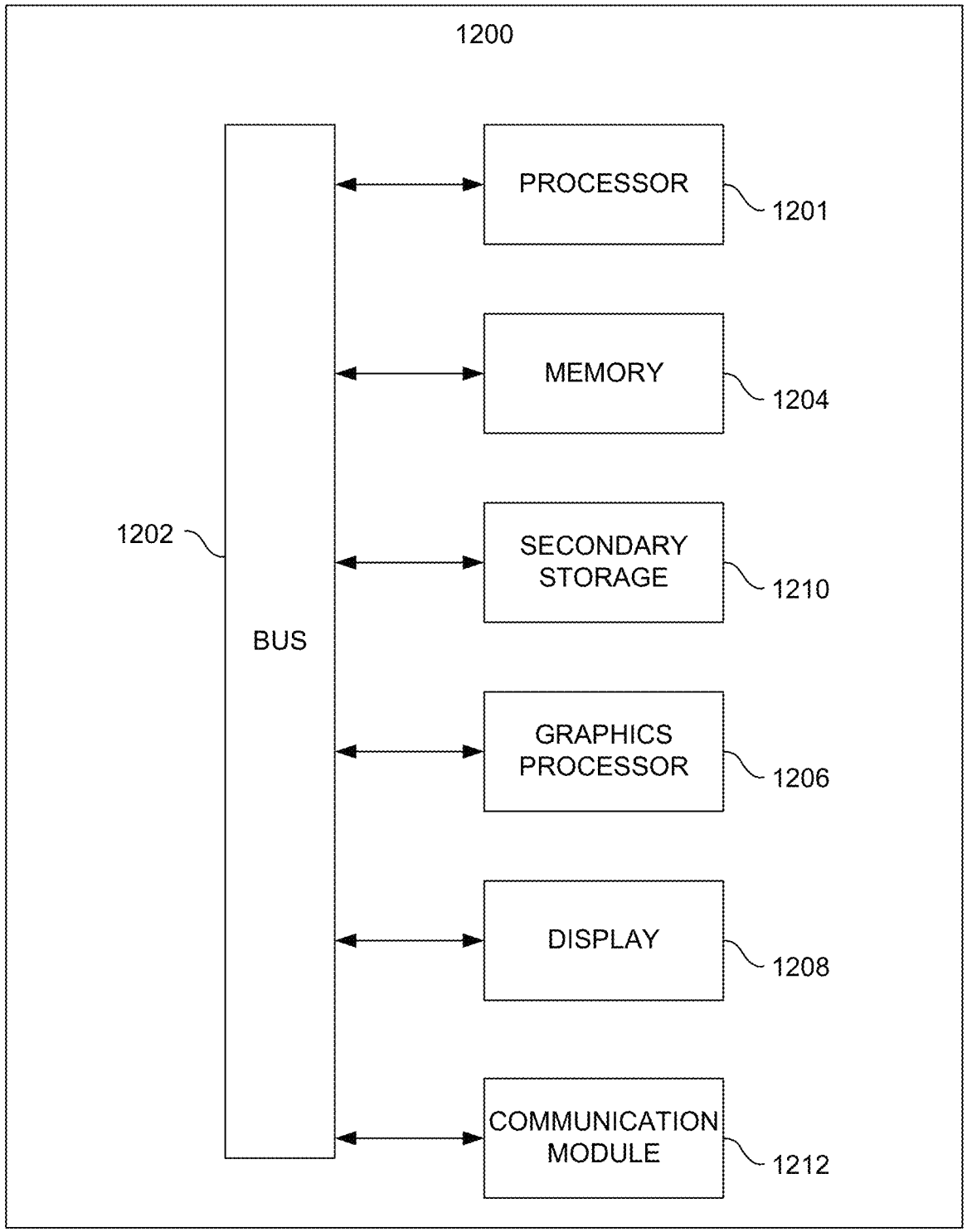
FIG. 12 illustrates an exemplary system, in accordance with one embodiment.

FIG. 12 illustrates an exemplary system 1200, in accordance with one embodiment. As an option, the system 1200 may be implemented in the context of any of the devices of the network architecture 1100 of FIG. 11. Of course, the system 1200 may be implemented in any desired environment.

As shown, a system 1200 is provided including at least one central processor 1201 which is connected to a communication bus 1202. The system 1200 also includes main memory 1204 [e.g. random access memory (RAM), etc.]. The system 1200 also includes a graphics processor 1206 and a display 1208.

The system 1200 may also include a secondary storage 1210. The secondary storage 1210 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 1204, the secondary storage 1210, and/or any other memory, for that matter. Such computer programs, when executed, enable the system 1200 to perform various functions (as set forth above, for example). Memory 1204, storage 1210 and/or any other storage are possible examples of non-transitory computer-readable media.

The system 1200 may also include one or more communication modules 1212. The communication module 1212 may be operable to facilitate communication between the system 1200 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    identify transactional data of a plurality of users;
    cluster the plurality of users based on the transactional data, to form groups of users having transactional data representing similar transactional behavior;
    generate synthesized transactional data for the users in each group by:
        identifying a subset of the transactional data that corresponds to the users in each group,
        shuffling the transactional data in the subset across the users in each group, wherein the shuffling includes:
            constructing a pool of transactions from the subset of the transactional data,
            for each user in each group, sampling transactions from the pool based on:
                a number of transactions associated with the user in the subset of the transactional data, and
                a category of each of the transactions associated with the user in the subset of the transactional data,
            wherein at least one of:
                a number of transactions sampled from the pool for each user in each group matches the number of transactions in the subset of the transactional data that are associated with the user, or
                a number of transactions of a particular category sampled from the pool for each user in each group matches a number of transactions of the particular category in the subset of the transactional data that are associated with the user, and
        perturbing portions of the shuffled transactional data.

2. The non-transitory computer-readable media of claim 1, wherein the transactional data of a plurality of users is transactional records stored for the plurality of users that represent financial transaction associated with the plurality of users.

3. The non-transitory computer-readable media of claim 1, wherein clustering the plurality of users based on the transactional data includes:
    encoding historical transactional data to form a knowledge graph, and
    learning a continuous representation for entities in the graph, and clustering the plurality of users based on the learned entities.

4. The non-transitory computer-readable media of claim 3, wherein knowledge graph is generated to include:
nodes representing users, merchants, and geo-locations, and
edges representing transaction features.

5. The non-transitory computer-readable media of claim 1, wherein the shuffling is performed stochastically.

6. The non-transitory computer-readable media of claim 1, wherein the number of transactions sampled from the pool for each user in each group matches the number of transactions in the subset of the transactional data that are associated with the user.

7. The non-transitory computer-readable media of claim 1, wherein the number of transactions of a particular category sampled from the pool for each user in each group matches the number of transactions of the particular category in the subset of the transactional data that are associated with the user.

8. The non-transitory computer-readable media of claim 1, wherein perturbing portions of the shuffled transactional data includes:
perturbing transaction amounts within the shuffled transactional data.

9. The non-transitory computer-readable media of claim 8, wherein the transaction amounts are perturbed up to a predefined maximum threshold percentage.

10. The non-transitory computer-readable media of claim 1, wherein perturbing portions of the shuffled transactional data includes:
shuffling elements of transaction descriptions within the shuffled transactional data.

11. The non-transitory computer-readable media of claim 10, wherein the elements are one or more consecutive words in a transaction description carrying homogeneous related information and are identified using machine learning models.

12. The non-transitory computer-readable media of claim 10, wherein the elements within each of the transaction descriptions are shuffled randomly.

13. The non-transitory computer-readable media of claim 1, wherein perturbing portions of the shuffled transactional data includes:
masking Personally Identifiable Information (PII).

14. The non-transitory computer-readable media of claim 13, wherein the PII includes at least one of:
social security number,
credit card number, or
user name.

15. The non-transitory computer-readable media of claim 13, wherein the masking is performed using deep learning.

16. The non-transitory computer-readable media of claim 1, wherein perturbing portions of the shuffled transactional data includes:
adding noise to transaction descriptions.

17. A method, comprising:
at a computer system:
identifying transactional data of a plurality of users;
clustering the plurality of users based on the transactional data, to form groups of users having transactional data representing similar transactional behavior;
generating synthesized transactional data for the users in each group by:
identifying a subset of the transactional data that corresponds to the users in each group,
shuffling the transactional data in the subset across the users in each group, wherein the shuffling includes:
constructing a pool of transactions from the subset of the transactional data,
for each user in each group, sampling transactions from the pool based on:
a number of transactions associated with the user in the subset of the transactional data, and
a category of each of the transactions associated with the user in the subset of the transactional data,
wherein at least one of:
a number of transactions sampled from the pool for each user in each group matches the number of transactions in the subset of the transactional data that are associated with the user, or
a number of transactions of a particular category sampled from the pool for each user in each group matches a number of transactions of the particular category in the subset of the transactional data that are associated with the user, and
perturbing portions of the shuffled transactional data.

18. A system, comprising:
a non-transitory memory storing instructions; and
one or more processors in communication with the non-transitory memory that execute the instructions to:
identify transactional data of a plurality of users;
cluster the plurality of users based on the transactional data, to form groups of users having transactional data representing similar transactional behavior;
generate synthesized transactional data for the users in each group by:
identifying a subset of the transactional data that corresponds to the users in each group,
shuffling the transactional data in the subset across the users in each group, wherein the shuffling includes:
constructing a pool of transactions from the subset of the transactional data,
for each user in each group, sampling transactions from the pool based on:
a number of transactions associated with the user in the subset of the transactional data, and
a category of each of the transactions associated with the user in the subset of the transactional data,
wherein at least one of:
a number of transactions sampled from the pool for each user in each group matches the number of transactions in the subset of the transactional data that are associated with the user, or
a number of transactions of a particular category sampled from the pool for each user in each group matches a number of transactions of the particular category in the subset of the transactional data that are associated with the user, and
perturbing portions of the shuffled transactional data.

* * * * *